United States Patent Office 3,582,398
Patented June 1, 1971

3,582,398
POLYCARBONATE SUBSTRATE WITH AN
ACRYLATE COATING THEREON
Harold R. Ringler, Wayne, Mich., assignor to
General Electric Company
No Drawing. Filed May 18, 1965, Ser. No. 456,819
Int. Cl. B32b 27/08
U.S. Cl. 117—33.3                    2 Claims

ABSTRACT OF THE DISCLOSURE

A thermoplastic part having an aromatic polycarbonate resin substrate of 2,2'-bis(4-hydroxyphenyl)propane and a transparent polymethylmethacrylate coating thereon, which coating can in addition contain an ultraviolet light absorbent.

---

This invention relates to parts fabricated of transparent thermoplastic polymers having enhanced optical properties and to a process for their manufacture. More particularly, this invention relates to parts fabricated of transparent polyacrylates and polycarbonates having enhanced optical properties and to a process for their manufacture which comprises coating said plastic parts with various thermoplastic materials.

Polyacrylate and polycarbonate resins are well known, commercially available materials whose ability to resist corrosion and breakage, and to withstand considerable periods of exposure to the atmosphere without degradation, have rendered them particularly suitable for a variety of applications in the plastics industry. Such polymers or resins have been especially useful as substitutes for glass, i.e., in applications where a high degree of transparency is essential, as for example, in the manufacture of tail lights and stop light lenses, protective shields for fluorescent street lights, safety shields in inspection windows, and boat windshields. Also, such polymers have been very useful in the packaging industry wherein clear transparent materials are required.

Although the optical properties of polyacrylates and polycarbonates are superior to those of other transparent thermoplastic materials, they nevertheless do not, in either case, equal many of the optical properties of glass. Accordingly, attempts have been made to improve the transparency of (i.e., reduce the percentage of light absorbed by) polyacrylate and polycarbonate formed parts. Heretofore, methods for improving the transparency of such polymers or resins have been restricted to (1) the purification of the starting materials used in their preparation, and (2) a careful control of the process conditions under which these polymers are formed. An apparent improvement in the transparency of the polycarbonates may also be effected by a mixing with the polycarbonate resin, prior to fabrication, additives which tend to eliminate, to a certain extent, the residual color which is characteristic of polycarbonates. Light transmittance is slightly decreased by the additives. The apparent improvement is due to the visual impression of transparency caused by comparing a yellow sample to a colorless sample. Heretofore, no simple process for improving optical properties of parts fabricated from either polyacrylate or polycarbonate materials, i.e., improve the transparency of the polymers *after* they have been fabricated into parts, has been found. In addition, attempts to improve the optical properties of the polyacrylate and the polycarbonate materials by controlling the conditions prior to fabrication are costly and have not met with a large degree of success.

Unexpectedly, I have found that in accordance with my invention, the optical properties of parts fabricated from polyacrylate or polycarbonate resins may be significantly improved. Briefly stated, the process for improving the optical properties, and especially the transparency, of a fabricated part comprising a resin selected from the class consisting of polyacrylate resins and polycarbonate resins, in accordance with my invention, comprises the steps of (a) coating a surface of the part with an inert volatile solvent solution containing not more than 20 percent, by weight of the solution, of a transparent thermoplastic and (b) removing the inert volatile solvent from said surface to provide a coating of said transparent thermoplastic thereon, said thermoplastic being selected from (1) the group consisting of polyacrylate and cellulose acetate butyrate when treating a fabricated polyacrylate part and (2) the group consisting of a polycarbonate, a polyacrylate, cellulose acetate butyrate, and polystyrene when treating a fabricated polycarbonate part. It is particularly surprising and unexpected that enhanced optical properties and particularly, enhanced transparency is obtained utilizing the process of my invention as a slight variance from the combinations of thermoplastics noted above will not yield the same results. For example, a polystyrene may be used to coat a polycarbonate, but coating a polystyrene with another of the coating materials such as cellulose acetate butyrate decreases the optical properties of the polystyrene.

Accordingly, one object of this invention is to improve the optical properties of a fabricated part of a transparent polyacrylate resin.

Another object of this invention is to enhance the optical properties of a fabricated part of a transparent polycarbonate resin.

A third object of this invention is to provide a process for enhancing the optical properties of a transparent polyacrylate fabricated part by coating said part with a thermoplastic selected from the group consisting of a polyacrylate and cellulose acetate butyrate material.

Still another object of this invention is to provide a process for enhancing the optical properties of a fabricated polycarbonate part which comprises coating said part with a thermoplastic material selected from the group consisting of a polycarbonate, a polyacrylate, cellulose acetate butyrate, and polystyrene.

Briefly stated, the method of rendering a thermoplastic transparent fabricated part more transparent in accordance with my invention comprises the steps of (a) coating a surface of the thermoplastic part with an inert volatile solvent solution containing not more than 20 percent, by weight, of a transparent thermoplastic material dissolved therein and (b) removing the inert volatile solvent from said surface to provide a coating on said transparent thermoplastic part. As stated above, when the transparent fabricated part is fabricated from a polyacrylate, the coating is selected from the group consisting of polyacrylate and cellulose acetate butyrate. When the thermoplastic fabricated part is fabricated from a polycarbonate, the coating is selected from the group consisting of a polycarbonate, a polyacrylate, cellulose acetate butyrate, and polystyrene.

In general, any volatile solvent, either organic or inorganic in nature which is inert, i.e., will not react with the polycarbonate or polyacrylate part to be treated, but which is capable of dissolving the above-mentioned thermoplastic resins, may be used in the process of the invention. Examples of suitable solvents are methylene-dichloride, 1,2-dichloroethylene, chloroform, benzene and toluene.

The coating solution used in the process of the invention may be prepared by dissolving a minor amount, i.e., not more than about 20 percent, by weight, based on the total weight of the solvent, of one of the above-mentioned thermoplastics therein. In this regard, I have found that the concentration of the coating solution is critical to the successful practice of the invention and that solutions having a concentration of more than 20 percet will not provide the desired improvements in optical properties. I have also found that when the concentration of the thermoplastic in the coating solution is less than 0.5 percent, by weight, based upon the total weight of the solvent, poor results are obtainable because of the thin coating deposited on the thermoplastic fabricated part. Accordingly, the concentration of the thermoplastic material in the solvent should range between 5 and 10 percent, by weight, as this range produces the greatest improvement in optical properties.

In a preferred embodiment of this invention, I have found that the coating solution may also contain a minor amount of an ultraviolet light absorbent compound or stabilizer so that the treated polyacrylate or polycarbonate part will, in addition to exhibiting an improvement in optical properties, exhibit an improved resistance to the effects of ultraviolet light. The preferred ultraviolet light absorbent compounds or stabilizers are those of the 2 hydroxy benzophenone or benzotriazole series. Examples of these are: 2-hydroxy-4-n-octoxybenzophenone, substituted hydroxyphenylbenzotriazole, 2-(2'-hydroxy - 5' - methylphenyl)-benzotriazole, and 2-hydroxy-4-methoxybenzophenone. Further examples of ultraviolet light absorbers which may be used in the practice of the invention may be found in U.S. Pat. No. 3,043,709. In general, I have found that the proportion of the ultraviolet light absorber may vary from about 0.01 to about 20 percent based upon the total weight of the coating solution, but from 0.5 to 10 percent is generally preferred.

The coating of the fabricated polyacrylate or polycarbonate parts with the inert volatile solvent solution of one of the above-mentioned thermoplastics (and ultraviolet absorbent, if desired) may be accomplished in any one of a number of ways, as, for instance, by dipping, by spraying or by casting. In general, I prefer to dip the fabricated polycarylate or polycarbonate part into a bath of the coating solution. I have found that particularly good results may be obtained when the time of the part to be treated in the coating solution ranges from about 2 to about 20 seconds. However, this value is, of course, dependent upon the concentration of the solution used and the particular thermoplastic disssolved therein. Coatings using this procedure may be obtained which have thicknesses ranging up to 20 mils.

As will be appreciated by those skilled in the art, other coating methods may be employed. For example, coating may be accomplished using knife coating or roller coating techniques.

After the formed polyacrylate or polycarbonate part is coated with the thermoplastic solution, the inert volatile solvent may be removed by drying the coated part until the volatile solvent evaporate, leaving a coating on the thermoplastic on the surface (or surfaces) to which the solution was applied. The drying operation may be hastened by the use of drying apparatus such as, for example, a drying oven. I have found it particularly advantageous to oven-age the coated part (subsequent to removal of the volatile solvent) at a temperature of from about 50° C. to about 100° C. for a period of time ranging from about 1 to about 5 hours.

That the transparency of parts fabricated of polyacrylate and polycarbonate resins may be improved by treating them in accordance with the above-described process is totally unexpected and is not fully understood. As stated above, polyacrylate and polycarbonate resins are unique insofar as the present invention is concerned as parts fabricated from other thermoplastics, such as polystyrene or cellulose acetate butyrate, do not exhibit any improvement in transparency when treated by the process outlined above.

The term "polyacrylate" as used herein is meant to embrace within its scope those polymers or resins resulting from the polymerization of one or more acrylates such as, for example, methyl acrylate, ethyl acrylate, butyl acrylate, 2-ethylhexyl acrylate, etc. as well as the methacrylates such as, for instance, methyl methacrylate, ethyl methacrylate, butyl methacrylate, hexyl methacrylate, etc. Copolymers of the above acrylate and methacrylate monomers are also included within the term "polyacrylate" as it appears herein. The polymerization of the monomeric acrylates and methacrylates to provide the polyacrylate resins useful in the practice of the invention may be accomplished by any of the well known polymerization techniques. The polyacrylates having a molecular weight ranging from about 15,000 to about 150,000, a specific gravity ranging from about 1.35 to 2.3, and a tensile strength of from about 15,000 to about 30,000 p.s.i. are generally preferred.

The polycarbonate resins useful in the practice of the invention may be prepared by reacting a dihydric phenol with a carbonate precursor such as phosgene, a haloformate, or a carbonate ester. Generally speaking, such carbonate polymers may be typified as possessing recurring structural units of the formula:

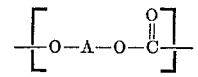

wherein A is a divalent aromatic radical of the dihydric phenol employed in the polymer producing reaction. Preferably, the carbonate polymers used to provide the resin mixtures of the invention have an intrinsic viscosity (as measured in p-dioxane in deciliters per gram at 30° C.) ranging from about 0.35 to about 0.75. The dihydric phenols which may be employed to provide such aromatic carbonate polymers are mononuclear or polynuclear aromatic compounds, containing as functional groups, 2 hydroxyl radicals, each of which is attached directly to a carbon atom of an aromatic nucleus. Typical dihydric phenols are 2,2'-bis-(4-hydroxyphenyl)-propane;
hydroquinone;
resorcinol;
2,2'-bis-(4-hydroxyphenyl)-pentane;
2,4'-dihydroxyphenyl methane;
bis-(2-hydroxyphenyl)-methane;
bis-(4-hydroxyphenyl)-methane;
bis-(4-hydroxy-5-nitrophenyl)-methane;
1,1'-bis-(4-hydroxyphenyl)-ethane;
3,3'-bis-(4-hydroxyphenyl)-pentane;
2,2'-dihydroxydiphenyl;
2,6-dihydroxynaphthylene;
bis-(4-hydroxyphenyl)-sulfone;
2,4'-dihydroxydiphenyl sulfone;
bis-(4-hydroxydiphenyl)-disulfone;
4,4'-dihydroxydiphenyl ether; and
4,4'-dihydroxy-2,5-diethoxydiphenyl ether.

A variety of additional dihydric phenols which may be employed to provide such carbonate polymers are disclosed in U.S. Pat. No. 2,999,835 of Eugene P. Goldberg, assigned to the assignee of the present invention, the contents of which are incorporated herein by reference. It is, of course, possible to employ two or more different dihydric phenols or a dihydric phenol in combination with a glycol, a hydroxy or acid terminated polyester, or a dibasic acid in the event a carbonate copolymer rather than a homopolymer is desired for use in the preparation of the polycarbonates useful in the practice of this invention. More specific directions for preparing polycarbonate resins as well as other starting materials and polymers prepared therefrom may be found in Canadian Pat. No. 661,282 and in U.S. pat. No. 3,030,331, assigned to the assignee of this invention.

The cellulose acetate butyrate polymers used in the process of this invention have a density of the order of 1.14 to 1.22, a softening temperature ranging from about 140 to 250° F. and an average molecular weight as determined by viscosity measurements ranging from about 12,000 to about 150,000.

Generall speaking, the all-purpose normal flow polystyrenes having densities in the order of 1.06 and an average molecular weight ranging from about 15,000 to about 150,000 as estimated by viscosity measurements, may be employed in the practice of the present invention.

In order that those skilled in the art may better understand how the present invention may be practiced, the following examples are given by way of illustration and not by way of limitation. All percentages expressed in the examples are by weight.

EXAMPLE 1

This example is designed to illustrate a procedure for coating polyacrylates and polycarbonates and also the enhanced optical properties obtained thereby.

Samples of a polycarbonate of 2,2'-bis-(4-hydroxyphenyl)-propane having an intrinsic viscosity of 0.54 dl./g. (deciliter per gram) as measured in p-dioxane at 30° C. and a molding and extrusion methylmethacrylate composition identified as Lucite and obtained from E. I. du Pont de Nemours, Inc., was molded into discs measuring 2 inches in diameter and ⅛ inch in thickness. Thermoplastic resin coating solutions were prepared by dissolving the desired concentration of coating resins in powdered form in the desired solvent. The molded parts were coated by vertically dipping the discs in 100 ml. of the coating solution. Immersion times of ½ to 5 seconds were employed. Upon removal of the discs from the coating bath, the excess solution was permitted to drain off as quickly as possible and the discs air dried for at least 24 hours. Subsequently, the coated discs were cured in an oven for 3 hours at 150° C.

Optical characteristics of the so-coated discs and the uncoated controls were determined using a tristimulus colorimeter. The property considered most indicative of the changes brought about by the practice of this invention is the luminous transmittance. Luminous transmittance is defined as the ratio (expressed as a percentage) of radiant flux transmitted by the sample to the radiant flux incident on the sample. The instrument used in this work was the Model D Color-Eye, manufactured by the Instrument Development Laboratories, Inc. of Attleboro, Mass. The instrument is so constructed and calibrated that luminous transmittance ($Y_{CIE}$) can be read directly.

The results obtained from the above test as well as the substrate used, the coating material, the solvent for the coating material, and the concentration of coating material in the solvent are set forth in the following table.

TABLE I.—OPTICAL PROPERTIES OF POLYCARBONATES AND POLYACRYLATES HAVING THERMOPLASTIC COATINGS

| Substrate | Coating material | Concentration of coating material in solvent | Solvent for coating material | Luminous transmittance Before coating | Luminous transmittance After coating | Percent change in luminous transmittance |
|---|---|---|---|---|---|---|
| Polycarbonate | polymethylmethacrylate [1] | 5.0 | 1,2-dichloroethane | 77.70 | 80.67 | 13.3 |
|  | do.[1] | 0.5 | do | 78.80 | 79.28 | 2.3 |
|  | Polystyrene [2] | 5.0 | do | 78.57 | 79.00 | 2.0 |
|  | do [2] | 5.0 | Benzene | 78.41 | 78.62 | 1.0 |
|  | do [2] | 0.5 | do | 78.20 | 79.11 | 4.2 |
|  | do [2] | 0.5 | 1,2-dichloroethane | 78.61 | 78.71 | 0.6 |
|  | Cellulose acetate butyrate [3] | 5.0 | do | 77.40 | 78.65 | 5.2 |
|  | Polycarbonate | 5.0 | do | 78.93 | 79.50 | 2.7 |
| Polymethylmethacrylate [1] | Polymethylmethacrylate [1] | 0.5 | do | 92.03 | 92.50 | 5.9 |
|  | do [1] | 5.0 | do | 91.49 | 92.22 | 8.8 |
|  | do [1] | 20.0 | Methylenedichloride | 92.22 | 92.49 | 3.5 |
|  | Cellulose acetate butyrate [3] | 0.5 | 1,2-dichloroethane | 92.28 | 92.38 | 1.3 |
|  | do [3] | 5.0 | do | 92.20 | 92.78 | 7.4 |

[1] An acrylic resin molding powder obtainable from E. I. Du Pont de Nemours, Inc., Polychemicals Division, and identified as Lucite.
[2] An unsubstituted polystyrene molding compound having a molecular weight of approximately 350,000 obtainable from the Dow Chemical Company and identified as Styron 666.
[3] A cellulose acetate butyrate molding compound and extruding composition obtainable from Eastman Chemical Products, Inc., and identified as Tenite Butyrate.

From the above, it is apparent that the luminous transmittance is improved with coatings by the process of this invention. In actuality, the luminous transmittance is improved to an even greater extent than that indicated in the table as the thickness of the coating composition or layer has not been taken into consideration in determining luminous transmittance. In other words, the luminous transmittance as determined after coating is based on a thicker sample than that obtained prior to coating.

EXAMPLE 2

This example is designed to illustrate the criticality of the particular combination of thermoplastic materials employed in this invention. Combinations other than those indicated above, were employed in this example. Samples were prepared in the same manner as in Example 1. In addition, luminous transmittance was determined using the colorimeter defined in Example 1. The following table illustrates the substrate thermoplastic material employed, the coating material employed, the solutions including the concentration of thermoplastic in the solvents and the luminous transmittance.

TABLE II.—OPTICAL PROPERTIES OF VARIOUS THERMOPLASTICS HAVING THERMOPLASTIC COATINGS

| Substrate [1] | Coating material [1] | Concentration of coating material in solvent | Solvent for coating material | Luminous transmittance Before coating | Luminous transmittance After coating | Percent change in luminous transmittance |
|---|---|---|---|---|---|---|
| Polystyrene | Cellulose acetate butyrate | 0.5 | 1,2-dichloroethylene | 89.62 | 61.40 | −195.0 |
| | do | 5.0 | do | 89.63 | 27.50 | −619.0 |
| | Polymethylmethacrylate | 0.5 | do | 89.68 | 74.51 | −147.0 |
| | do | 5.0 | do | 89.83 | 47.13 | −421.0 |
| | do | 20.0 | Methylenedichloride | 89.88 | 23.24 | −658.0 |
| | Polystyrene | 0.5 | Benzene | 89.76 | 89.56 | −1.9 |
| | do | 0.5 | 1,2-dichloroethylene | 89.70 | 89.50 | −1.9 |
| | do | 5.0 | Benezne | 89.69 | 89.61 | −0.8 |
| | do | 5.0 | 1,2-dichloroethylene | 89.69 | 89.50 | −1.8 |
| | do | 20.0 | Chloroform | 89.65 | 9.00 | −780.0 |
| Cellulose acetate butyrate | Cellulose acetate butyrate | 5.0 | 1,2-dichloroethylene | 87.10 | 79.40 | −59.7 |
| | do | 0.5 | do | 870.9 | 35.60 | −399.0 |
| | Polymethylmethacrylate | 0.5 | do | 86.99 | 74.41 | −14.4 |
| | do | 5.0 | do | 87.21 | 41.05 | −361.0 |
| | Polystyrene | 0.5 | Benzene | 86.46 | 85.74 | −9.3 |
| | do | 0.5 | 1,2-dichloroethylene | 87.14 | 65.10 | −171.0 |
| | do | 5.0 | do | 87.15 | 33.79 | −415.0 |
| Polymethylmethacrylate | Cellulose acetate butyrate | 0.5 | Chloroform | 87.10 | 30.07 | −442.6 |
| | Polystyrene | 0.5 | Benzene | 92.11 | 91.02 | −13.8 |
| | do | 0.5 | 1,2-dichloroethylene | 91.65 | 81.81 | −118.0 |
| | do | 5.0 | Benzene | 92.11 | 85.41 | −84.9 |
| | do | 5.0 | 1,2-dichloroethylene | 92.02 | 69.00 | −288.0 |
| | do | 20.0 | Methylenedichloride | 92.20 | 45.75 | −595.0 |
| Cellulose acetate butyrate | Polycarbonate | 5.0 | 1,2-dichloroethylene | 87.38 | 52.20 | −278.0 |
| Polymethylmethacrylate | do | 5.0 | do | 92.11 | 85.11 | −88.8 |
| Polystyrene | do | 5.0 | do | 89.90 | 55.75 | −338.0 |

[1] All the thermoplastics employed were the same as those described in Example 1 supra.

From the above table, it is apparent that combinations other than those of the instant invention do not display improved optical properties.

EXAMPLE 3

In this example, samples were coated using the procedures of Example 1. However, in this example, an ultraviolet absorber was contained in the coating solution. In all cases, 5 percent, by weight, of the coating polymer and 3 percent, by weight, of the ultraviolet absorber were dissolved in the solvent. The 2 inch diameter disc was dipped briefly into the solution, and the excess solution allowed to drain quickly. The part was then air dried at room temperature for at least 24 hours. Additional curing was effected by oven aging at 80° C. for 3 hours. The coated samples were placed in an exposure unit on a turn table under 6 G.E. RS sunlamps. The samples were located 6¾ inches below the lamp on a table with a circumference having a radius of 10 inches from the center of the turn table.

At the end of the 168 hours, the samples were removed from the turn table and characterized using the previously mentioned tristimulus colorimeter and conventional colorimetric techniques. Comparison of the values after exposure to those determined before the exposure afforded a quantitative measure of the color change taking place. The value most indicative of the difference between samples before and after exposure is the total color differences, $\Delta E$, calculated via the Adams-Nickenson equation. The value of $\Delta E$ is so defined that a value of 1.0 or less may be regarded as generally insignificant in most commercial transactions, 1.5 as slight, 2.5 as noticeable, 3.5 appreciable, and 7.0 as large. The luminous transmittance values were also determined as a measure of transparency by the techniques set forth in Example 1.

The results obtained as well as the absorber and the coating materials are listed in Table III below.

TABLE III.—EFFECT OF ULTRAVIOLET LIGHT ABSORBERS ON COATED POLYCARBONATES

| Coating material | Ultraviolet absorber | Solvent | Luminous transmittance Before coating | Luminous transmittance After coating | Total color difference $\Delta E$ |
|---|---|---|---|---|---|
| Polycarbonate | 2-hydroxy-4-n-octoxybenzophenone | Methylenedichloride | 86.0 | 86.1 | 1.33 |
| | do | 1,2-dichloroethylene | 86.1 | 86.5 | 1.87 |
| | do | Methylenetrichloride | 86.0 | 86.4 | 0.92 |
| | Substituted hydroxyphenylbenzotriazole [1] | Methylenedichloride | 86.1 | 86.5 | 1.12 |
| | do | 1,2-dichloroethylene | 86.4 | 86.8 | 0.90 |
| | do | Methylenetrichloride | 86.1 | 86.6 | 1.06 |
| | (2,2'-hydroxy-5'-methylphenyl)benzotriazole | do | (2) | (2) | (2) |
| Polystyrene | 2-hydroxy-4-n-octyoxybenzophenone | Benzene | 85.2 | 85.4 | 0.82 |
| | Substituted hydroxyphenylbenzotriazole [1] | do | 85.9 | 86.4 | 1.14 |
| Cellulose acetate butyrate | 2-hydroxy-4-n-octoxybenzophenone | Methylenedichloride | 87.4 | 88.0 | 1.06 |
| | do | 1,2-dichloroethylene | 87.6 | 88.2 | 1.51 |
| | Substituted hydroxyphenylbenzotriazole | Methylenedichloride | 87.8 | 88.4 | 1.20 |
| | do | 1,2-dichloroethylene | 87.5 | 88.3 | 1.04 |
| Polymethylmethacrylate | do | Methylenedichloride | 87.2 | 88.0 | 1.23 |
| | do | 1,2-dichloroethylene | 88.2 | 88.6 | 1.27 |
| | 2-hydroxy-4-methoxy benzophenone | Methylenedichloride | 88.2 | 88.7 | 0.99 |
| | do | 1,2-dichloroethylene | 87.6 | 88.0 | 1.06 |
| Control | | | 84.5 | 85.9 | 4.75 |

[1] The substituted hydroxyphenylbenzotriazole is a commercial ultraviolet absorber obtainable from Geigy Industrial Chemicals and identified as Tinuvin PS.
[2] Not measured.

From the above table, it can be seen that when an ultraviolet light absorber is used in the coating, there is only a negligible change in color after exposure to light for 168 hours. When compared to control samples, the relative difference in darkening is great. In addition, the luminous transmittance values of the samples were increased as expected.

The foregoing disclosure of this invention is not to be considered as limiting, since many variations may be made by those skilled in the art without departing from the scope or spirit of the foregoing description. For example, in addition to the ultraviolet stabilizers contained in the coating, various tints or coloring may be included in this coating.

What I claim as new and desire to secure by Letters Patent of the United States is:

1. A thermoplastic fabricated part having improved optical properties consisting essentially of a substrate of a polycarbonate resin of 2,2'-bis(4-hydroxyphenyl) propane and a transparent coating thereon of polymethylmethacrylate.

2. A fabricated part of claim 1 wherein the coating contains an ultraviolet light absorbent compound.

References Cited

UNITED STATES PATENTS

| | | | |
|---|---|---|---|
| 2,684,310 | 7/1954 | Prance et al. | 117—138.8 |
| 2,370,562 | 2/1945 | Meunier | 117—138.8X |
| 2,527,010 | 10/1950 | Jenner | 117—33.3X |
| 2,907,675 | 10/1959 | Gaylord | 117—138.8X |
| 3,069,287 | 12/1962 | Hudson | 117—138.8X |
| 3,264,372 | 8/1966 | Deichert et al. | 117—138.8X |
| 3,304,196 | 2/1967 | Deichert et al. | 117—33.3X |
| 3,309,219 | 3/1967 | Etherington | 117—138.8X |
| 3,309,220 | 3/1967 | Osteen | 117—138.8X |
| 2,622,991 | 12/1952 | Sturm | 117—138.8X |
| 3,095,422 | 6/1963 | Duennenberger et al. | 117—33.3X |

FOREIGN PATENTS

| | | | |
|---|---|---|---|
| 482,836 | 1938 | Great Britain | 117—138.8 |
| 774,891 | 5/1957 | Great Britain | 117—138.8 |

WILLIAM D. MARTIN, Primary Examiner

M. R. P. PERRONE, Jr., Assistant Examiner

U.S. Cl. X.R.

117—138.8 F, A, 161 UB; 161—183, 256

UNITED STATES PATENT OFFICE
CERTIFICATE OF CORRECTION

Patent No. U.S. 3,582,398        Dated June 1, 1971

Inventor(s) Harold R. Ringler

It is certified that error appears in the above-identified patent and that said Letters Patent are hereby corrected as shown below:

Column 3, line 25, "obtainable" should be --obtained--;

Column 3, line 56: "polycarylate" should be --polyacrylate--;

Column 3, line 62: "disssolved" should be --dissolved--;

Column 3, line 72: "evaporate" should be --evaporates--;

Column 8, line 8: "89.63" should be --89.93--;

Column 8, line 18: "870.9" should be --87.09--;

Column 8, line 56: "1.87" should be --0.87--.

Signed and sealed this 16th day of May 1972.

(SEAL)
Attest:

EDWARD M. FLETCHER, JR.        ROBERT GOTTSCHALK
Attesting Officer              Commissioner of Patents